(12) United States Patent
Momose et al.

(10) Patent No.: US 9,664,951 B2
(45) Date of Patent: May 30, 2017

(54) LIQUID CRYSTAL DISPLAY DEVICE AND ELECTRONIC DEVICE

(75) Inventors: Yoichi Momose, Matsumoto (JP); Nobutaka Urano, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 267 days.

(21) Appl. No.: 13/572,130

(22) Filed: Aug. 10, 2012

(65) Prior Publication Data

US 2013/0044271 A1 Feb. 21, 2013

(30) Foreign Application Priority Data

Aug. 17, 2011 (JP) ................................ 2011-178257
May 28, 2012 (JP) ................................ 2012-120521

(51) Int. Cl.
*G02F 1/1333* (2006.01)
*G02F 1/1335* (2006.01)
*F21V 8/00* (2006.01)
(52) U.S. Cl.
CPC ....... *G02F 1/133615* (2013.01); *G02B 6/009* (2013.01); *G02B 6/0068* (2013.01); *G02B 6/0073* (2013.01); *G02B 6/0085* (2013.01); *G02B 6/0088* (2013.01); *G02F 2001/133317* (2013.01); *G02F 2001/133628* (2013.01); *G02F 2201/46* (2013.01)
(58) Field of Classification Search
CPC ....... G02B 6/0085; G02F 2001/133317; G02F 2201/46
USPC ......................................................... 362/634
See application file for complete search history.

(56) References Cited

U.S. PATENT DOCUMENTS

| | | | |
|---|---|---|---|
| 6,611,092 B2 * | 8/2003 | Fujishiro | G02F 1/133604 313/43 |
| 6,960,001 B2 | 11/2005 | Nitto et al. | |
| 7,226,184 B2 | 6/2007 | Takahashi | |
| 7,246,916 B2 | 7/2007 | Nitto | |
| 7,261,434 B2 | 8/2007 | Miyamoto | |
| 7,556,415 B2 * | 7/2009 | Hamada et al. | ............. 362/612 |
| 7,978,286 B2 * | 7/2011 | Kono et al. | ..................... 349/64 |
| 8,197,081 B2 * | 6/2012 | Cho et al. | .................... 362/97.1 |

(Continued)

FOREIGN PATENT DOCUMENTS

JP  A-2004-186004  7/2004
JP  2006-216244 A  8/2006

(Continued)

*Primary Examiner* — Jessica M Merlin
*Assistant Examiner* — Mark Teets
(74) *Attorney, Agent, or Firm* — Oliff PLC (57) ABSTRACT

A liquid crystal display device is provided which includes a liquid crystal panel, a light guide plate having a plurality of side surfaces, a plurality of light emitting elements; a light source substrate having a mounting surface on which the plurality of the light emitting elements are mounted, a light source support member made of metal, including a substrate support plate portion supporting the light source substrate, with the substrate support plate portion coming into contact with a rear surface of the mounting surface, a first surface and a second surface different from the first surface, and a metal frame accommodating the liquid crystal panel and the light guide plate, and including a first contact portion that comes into contact with the first surface and a second contact portion that comes into contact with the second surface.

4 Claims, 7 Drawing Sheets

(56) References Cited

U.S. PATENT DOCUMENTS

| | | | |
|---|---|---|---|
| 8,558,971 B2* | 10/2013 | Li | 349/65 |
| 9,244,299 B2* | 1/2016 | Tang | G02F 1/133308 |
| 2002/0001184 A1* | 1/2002 | Kim et al. | 362/27 |
| 2006/0007705 A1 | 1/2006 | Yonemura | |
| 2007/0139961 A1* | 6/2007 | Cheah et al. | 362/612 |
| 2008/0297695 A1* | 12/2008 | Sekiguchi et al. | 349/65 |
| 2009/0096957 A1* | 4/2009 | Hiyama et al. | 349/65 |
| 2009/0128730 A1* | 5/2009 | Hsu et al. | 349/58 |
| 2009/0128732 A1* | 5/2009 | Hamada | 349/58 |
| 2009/0251634 A1 | 10/2009 | Lu et al. | |
| 2010/0066937 A1* | 3/2010 | Yamashita | G02B 6/0085 349/58 |
| 2010/0118514 A1* | 5/2010 | Cho | G02B 6/0068 362/97.1 |
| 2010/0208159 A1* | 8/2010 | Oan | 349/58 |
| 2011/0043721 A1* | 2/2011 | Hwang | G02B 6/0085 349/58 |
| 2011/0069255 A1* | 3/2011 | Choi et al. | 349/63 |
| 2011/0095970 A1 | 4/2011 | Yoo | |
| 2011/0149602 A1* | 6/2011 | Lee et al. | 362/612 |
| 2012/0081925 A1* | 4/2012 | Cho | G02F 1/133615 362/613 |
| 2012/0162567 A1 | 6/2012 | Shimomichi | |
| 2013/0094245 A1* | 4/2013 | Kanda et al. | 362/611 |
| 2014/0232945 A1* | 8/2014 | Uno et al. | 348/739 |

FOREIGN PATENT DOCUMENTS

| | | |
|---|---|---|
| JP | A-2007-12416 | 1/2007 |
| JP | A-2007-26916 | 2/2007 |
| JP | A-2007-207615 | 8/2007 |
| JP | A-2007-248820 | 9/2007 |
| JP | A-2008-10436 | 1/2008 |
| JP | 2011-096629 A | 5/2011 |
| JP | 2012-137672 A | 7/2012 |
| TW | 200518360 A | 6/2005 |
| TW | 200942923 A | 10/2009 |

* cited by examiner

LIQUID CRYSTAL DISPLAY DEVICE AND ELECTRONIC DEVICE

BACKGROUND

1. Technical Field

The present invention relates to a liquid crystal display device in which a light guide plate, a light emitting element as a light source, and a liquid crystal panel are supported by a frame, and to an electronic device equipped with the liquid crystal display device.

2. Related Art

A liquid crystal display device, equipped with a transmissive liquid crystal panel, includes an illuminating device in which light emitting elements are arranged along side surfaces, designated as light incident portions, of a light guide plate, and a liquid crystal panel is arranged over an outgoing light surface of the light guide plate so as to overlap the light emitting element. Furthermore, the light guide plate, the light emitting elements, and the liquid crystal panel are supported between a first metal frame provided in the opposite direction to the direction in which display light is emitted, and a second metal frame provided in a direction in which the display light is emitted.

When the light emitting elements turn on and generate heat, a change in the amount of emitted light and a decrease in the life of the light emitting element occur. Therefore, a configuration is proposed in which a substrate on which light emitting elements are mounted is arranged so as to overlap the first metal frame, and thus the heat generated in the light emitting elements is dissipated through the substrate and the first metal frame (refer to JP-A-2007-207615).

However, because a large number of light emitting elements are provided in a large-sized liquid crystal display device used in an electronic device such as a liquid crystal television, the configuration described in JP-A-2007-207615 has a problem in that the heat generated in the light emitting elements cannot be sufficiently dissipated. On the other hand, because elements are densely provided in a small-sized liquid crystal display device used in an electronic device such as a portable telephone, there is also a problem in that the heat generated in the light emitting elements cannot be sufficiently dissipated.

Furthermore, in the liquid crystal display device, a resin frame is frequently arranged between a first metal frame and a second metal frame, for example, in order to position each of elements easily and precisely. This causes a problem in that the heat is easy to accumulate in the frame.

SUMMARY

An advantage of some aspects of the invention is to provide a liquid crystal display device capable of holding a light guide plate, light emitting elements, and a liquid crystal panel in place with first and second metal frames, and at the same time preventing light emitting elements from increasing in temperature, and an electronic device equipped with the liquid crystal display device.

According to an aspect of the invention, a liquid crystal display device includes a liquid crystal panel; a light guide plate having a main surface through which light is emitted to the liquid crystal panel, and a plurality of side surfaces, provided on one side of the liquid crystal panel; a plurality of light emitting elements arranged along at least one side surface among the plurality of side surfaces of the light guide plate and each of the plurality of light emitting elements having a light emitting surface facing the side surface, designated as a light incident portion; a light source substrate having a mounting surface on which the plurality of the light emitting elements are mounted; a light source support member made of metal with a plurality of surfaces, including a substrate support plate portion supporting the light source substrate, with the substrate support plate portion coming into contact with a rear surface of the mounting surface, with the plurality of surfaces including a first surface and a second surface different from the first surface; and a metal frame accommodating the liquid crystal panel and the light guide plate, and including a first contact portion that comes into contact with the first surface and a second contact portion that comes into contact with the second surface.

In the aspect of the invention, the first contact portion and the second contact portion of the metal frame may be disposed on inside surface of the metal frame that is accommodating the liquid crystal panel and the light guide plate.

Because of this, heat generated in the plurality of the light emitting elements is transferred to the light source support member made of metal through the light source substrate and thereafter is dissipated to the metal frame through the first contact portion and the second contact portion within the metal frame. Because of this, in the aspect of the invention, the heat generated in the light emitting elements may be dissipated using at least two routes, and thus the heat generated in the light emitting elements may be dissipated more efficiently. Therefore, the light emitting elements may be prevented from increasing in temperature.

In the aspect of the invention, the first surface and the second surface of the light source support member may be arranged so as to adjoin each other. Furthermore, the plurality of surfaces of the light source support member may include a third surface that is arranged between the first surface and the second surface of the light source support member, so as to face the light incident portion of the light guide plate.

Because of this, two heat transfer routes may be provided; one heat transfer route of the first surface and the other heat transfer route of the second surface. The first surface and the second surface are arranged so as to be separated from each other in opposite directions, that is, both in a direction of the visual recognition of the liquid crystal display device and in a direction of a rear surface of the liquid crystal display device, and thus the heat generated in the plurality of the light emitting elements may be dissipated more efficiently. Therefore, the light emitting elements may be prevented from increasing in temperature.

According to another aspect of the invention, a liquid crystal display device includes a first metal frame including a bottom plate; a light guide plate having a main surface and a plurality of side surfaces, arranged such that the main surface overlaps the bottom plate of the first metal frame; a plurality of light emitting elements arranged along at least one side surface among the plurality of side surfaces of the light guide plate and each of the plurality of the light emitting elements having a light emitting surface facing the side surface, designated as a light incident portion; a light source substrate having a mounting surface on which the plurality of the light emitting elements are mounted; a light source support member made of metal including a substrate support plate portion supporting the light source substrate, with the substrate support plate portion coming into contact with a rear surface of the mounting surface; a liquid crystal panel disposing in an opposite direction to a direction in which the first metal frame is positioned, with respect to the light guide plate; and a second metal frame including a front plate covering an peripheral area of the liquid crystal panel, the light source support member may have a first contact surface that comes into contact with the first metal frame and a second contact surface that comes into contact with the second metal frame.

In the aspect of the invention, the surface (the rear surface), opposite to the mounting surface, of the light source substrate on which the plurality of the light emitting elements are mounted, may come into contact with the light source support member made of metal, and the light source support member may have the first contact surface that comes into contact with the first metal frame and the second contact surface that comes into contact with the second metal frame. Because of this, the heat generated in the light emitting elements may be transferred to the light source support member made of metal through the light source substrate, and thereafter may be dissipated to the first metal frame through the first contact surface and at the same time to the second metal frame through the second contact surface. Because of this, in the aspect of the invention, the heat generated in the light emitting elements may be dissipated using at least two routes, and thus the heat generated in the light emitting elements may be dissipated more efficiently. Therefore, the light emitting elements may be prevented from increasing in temperature.

In the aspect of the invention, a resin frame which includes a plate-shaped support portion to interpose the light guide plate between the bottom plate of the first metal frame and the plate-shaped support portion of the resin frame, and to interpose the liquid crystal panel between the plate-shaped support portion of the resin frame and the second metal frame may be further included, the light incident portion of the light guide plate may be arranged between the second contact surface of the light source support member and the plate-shaped support portions, in a plane view from a normal direction of the main surface.

In this configuration, even in a case where the resin frame is used, the light source support member and the second metal frame may easily come into surface contact with each other.

In the aspect of the invention, the resin frame may be provided further to an inside than the light source support member, with respect to an in-plane direction of the light guide plate in the plane view from the normal direction of the main surface.

In this configuration, even in a case where the resin frame is used, the light source support member and the second metal frame may easily come into surface contact with each other.

In the aspect of the invention, the substrate support plate portion may face the light incident portion. Furthermore, the light source support member may include: a first plate that bends from an end portion of the substrate support plate portion, which is positioned in a direction of the bottom plate of the first metal frame, so as to form the first contact surface and overlap the bottom plate; and a second plate that bends from an end portion of the substrate support plate portion, which is positioned in a direction of the front plate of the second metal frame, so as to form the second contact surface and overlap the front plate.

In this case, the first plate may form from the substrate support plate portion both in a direction in which the light guide plate is positioned, and in the opposite direction to the direction in which the light guide plate is positioned.

In this configuration, because the first contact surface may increase in area, the heat generated in the plurality of the light emitting elements may be dissipated to the first metal frame more efficiently.

In the aspect of the invention, the second plate may form from the substrate support plate portion both in a direction in which the light guide plate is positioned, and in the opposite direction to the direction in which the light guide plate is positioned.

In this configuration, because the second contact surface may increase in area, the heat generated in the plurality of the light emitting elements may be dissipated to the second metal frame more efficiently.

In the aspect of the invention, a planar direction of the mounting surface may intersect a planar direction of the light incident portion, the second metal frame may include a side plate extending from an edge of the front plate toward the first metal frame, the light source support member may be arranged such that at least a part of the substrate support plate portion overlap the bottom plate of the first metal frame serving as the first contact surface, and the light source support member may include a first plate that bends from an end portion of the substrate support plate portion, which is positioned in the opposite direction to the direction in which the light guide plate is arranged, such that at least a part of the first plate overlap the side plate of the second metal frame serving as the second contact surface.

In this configuration, even though the mounting surface of the light source substrate is perpendicular to the light incident portion, the heat generated in the plurality of the light emitting elements may be dissipated to the first metal frame and the second metal frame.

In the aspect of the invention, the light source support member may further include a second plate that bends from a tip of the first plate in a direction in which the light guide plate is positioned, such that at least a part of the second plate and at least a part of first plate include the second contact surface.

In this configuration, because the second contact surface may increase in area, the heat generated in the plurality of the light emitting elements may be dissipated to the second metal frame more efficiently.

In the aspect of the invention, a resin frame may be further provided which includes a plate-shaped support portion to interpose the light guide plate between the bottom plate of the first metal frame and the plate-shaped support portion, the resin frame may include an opening in an area of the resin frame interposed between the light source support member and the second metal frame, and the second contact surface may be a portion of the light source support member which protrudes into the opening and comes into contact with the second metal frame.

In this configuration, even though the resin frame is interposed between the light source support member and the second metal frame, the heat generated in the plurality of the light emitting elements may be dissipated to the first metal frame and the second metal frame.

The liquid crystal display device according to the aspect of the invention is used in an electronic device such as a liquid crystal television.

BRIEF DESCRIPTION OF THE DRAWINGS

The invention will be described with reference to the accompanying drawings, wherein like numbers reference like elements.

DESCRIPTION OF EXEMPLARY EMBODIMENTS

Referring to the drawings, the embodiment is described in which an aspect of the invention is applied to a liquid crystal display device for a liquid crystal television. In the drawings that are referred to in the following description, layers and members are on different scales so as to enlarge them to an easily recognizable level. Furthermore, in the following description, one direction of the intersecting directions in the in-plane directions of a light guide plate and a liquid crystal panel is defined as the X-axis direction (the direction in which long sides of the light guide plate and the liquid crystal panel (a display panel) extend, as shown in the drawings). The other direction is defined as the Y-axis direction (the direction in which short sides of the light guide plate and the liquid crystal panel extend, as shown in the drawings). A direction intersecting the X-axis and Y-axis directions is defined as the Z-axis direction (the direction in which the light guide plate and the display panel are laminated, as shown in the drawings). In the drawings that are referred to in the following description, one pointer of the X-axis direction is defined as an X1 pointer, and the other pointer as an X2 pointer. One pointer (direction in which a protruding portion of a liquid crystal panel is arranged) of the Y-axis direction is defined as an Y1 pointer, and the other opposite to the one pointer as an Y2 pointer. One pointer (direction opposite to a rear surface of the light guide plate) is defined as a Z1 pointer (a lower pointer) of the Z-axis direction, and the other pointer, as opposite to the one pointer (the side to which illumination light and display light are emitted) to a Z2 pointer (an upper pointer).

First Embodiment of Aspect of the Invention

Whole Configuration

Figure 1A:
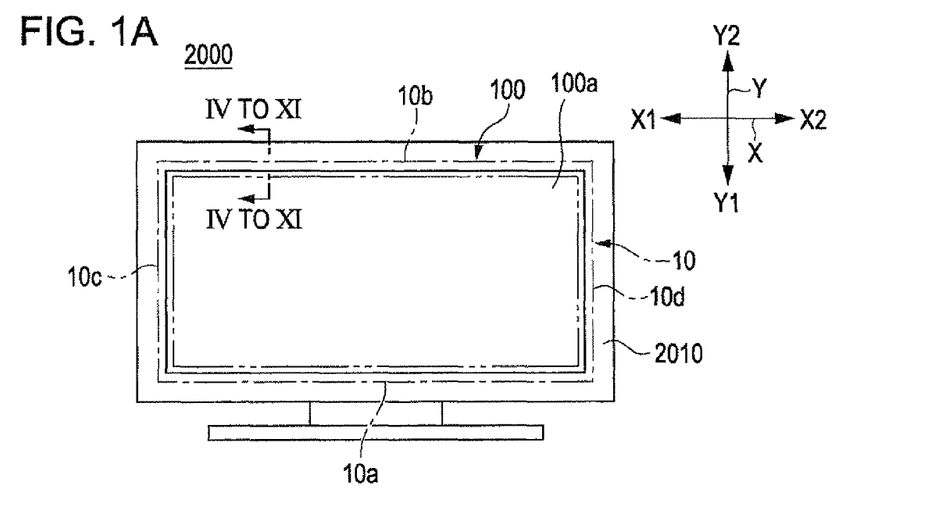
FIGS. 1A and 1B are explanatory views of a liquid crystal television (an electronic device) equipped with a liquid crystal display device according to a first embodiment of an aspect of the invention.
Figure 1B:
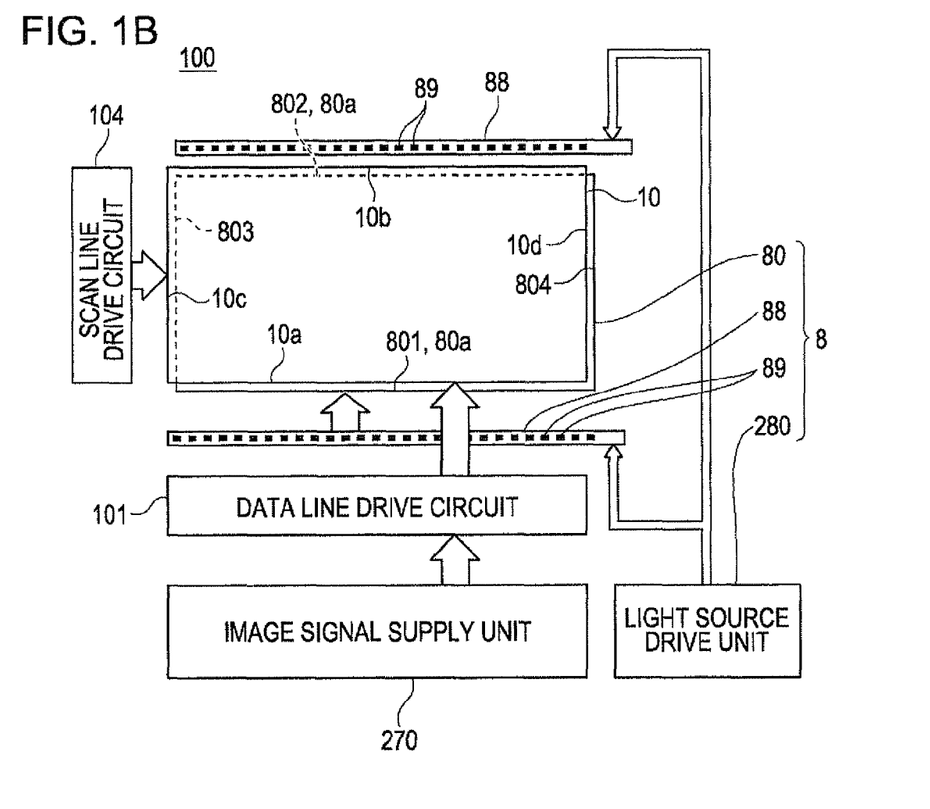

FIGS. 1A and 1B are explanatory views of a liquid crystal television (an electronic device) equipped with a liquid crystal display device according to a first embodiment of an aspect of the invention. FIG. 1A is an explanatory view schematically illustrating an external appearance of the liquid crystal television, and FIG. 1B is a block diagram illustrating an electric configuration of the liquid crystal display device.

As shown in FIG. 1A, an electronic device 2000 is the liquid crystal television, and includes a liquid crystal display device 100 and a frame 2010 for the television. The liquid crystal display device 100 includes a liquid crystal panel 10 (a display panel), which is described below, an image signal supply unit 270 outputting an image signal to the liquid crystal panel 10, and an illuminating device 8 supplying illumination light to the liquid crystal panel 10. Furthermore, the liquid crystal display device 100 includes a scan line drive circuit 104 driving scan lines that extend in the X-axis direction in the liquid crystal panel 10, and a data line drive circuit 101 driving data lines that extend in the Y-axis direction in the liquid crystal panel 10. Both of the scan line drive circuit 104 and the data line drive circuit 101 may be configured by being built into the liquid crystal panel 10. Furthermore, one of the scan line drive circuit 104 and the data line drive circuit 101 may be configured by being built into the liquid crystal panel 10, and the other may be configured by being built into a drive IC mounted on the liquid crystal panel 10 in a COG manner. Furthermore, one of the scan line drive circuit 104 and the data line drive circuit 101 may be configured by being built into the liquid crystal panel 10, and the other may be configured by being built into the drive IC mounted on a circuit board electrically connected to the liquid crystal panel 10. In addition, both of the scan line drive circuit 104 and the data line drive circuit 101 may be configured by being built into the drive IC that is independent of the liquid crystal panel 10.

In the first embodiment, the illuminating device 8 includes a light guide plate 80 arranged so as to overlap the liquid crystal panel 10, a plurality of light emitting elements 89 arranged along a side surface, designated as a light incident portion 80a, of side surfaces of the light guide plate 80, a source substrate 88 on which the plurality of light emitting elements 89 are mounted, and a light source drive unit 280 driving emitting elements 89. In the first embodiment, the liquid crystal panel 10 has the shape of a rectangle with four sides 10a, 10b, 10c, and 10d. Of the sides 10a, 10b, 10c, and 10d, the side 10a is the longest one positioned in the one pointer Y1 of the Y-axis direction. The side 10b is the longest one positioned in the other pointer Y2 of the Y-axis direction. The side 10c is the shortest one positioned in the one pointer X1 of the X-axis direction. The side 10d is the shortest one positioned in the other pointer X2 of the X-axis direction. To match this shape, the light guide plate 80 has four side surfaces 801, 802, 803, and 804 as well. Of the surfaces 801 to 804, the side surface 801 is positioned on the longest side in the one pointer Y1 of the Y-axis direction. The side surface 802 is positioned on the longest side in the other pointer Y2 of the Y-axis direction. The side surface 803 is positioned on the shortest side in the one pointer X1 of the X-axis direction. The side surface 804 is positioned on the shortest side in the other pointer X2 of the X-axis direction.

In the first embodiment, of the four side surfaces 801, 802, 803, and 804 of the light guide plate 80, the two side surfaces 801 and 802, which are opposite to each other in a direction of the short side (in the Y-axis direction) serve as a light incident portion 80a. Because of this, the light emitting elements 89 are arranged along the two side surfaces 801 and 802 (light incident portions 80a) of the light guide plate 80, respectively, and the light source substrates 88 extend along the two side surfaces 801 and 802 (light incident portions 80a) of the light guide plate 80, respectively.

Specific Configuration of Liquid Crystal Display Device 100

Figure 2A:
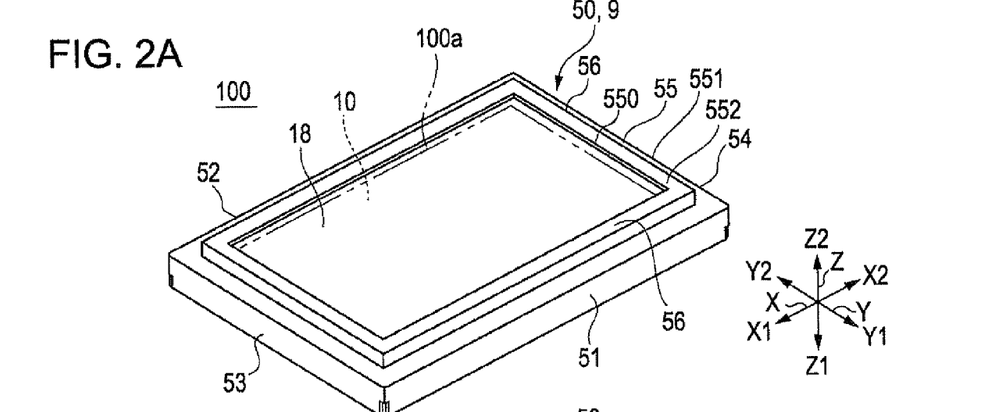
FIGS. 2A and 2B are explanatory views of the overall configuration of the liquid crystal display device according to the first embodiment of the aspect of the invention.
Figure 2B:
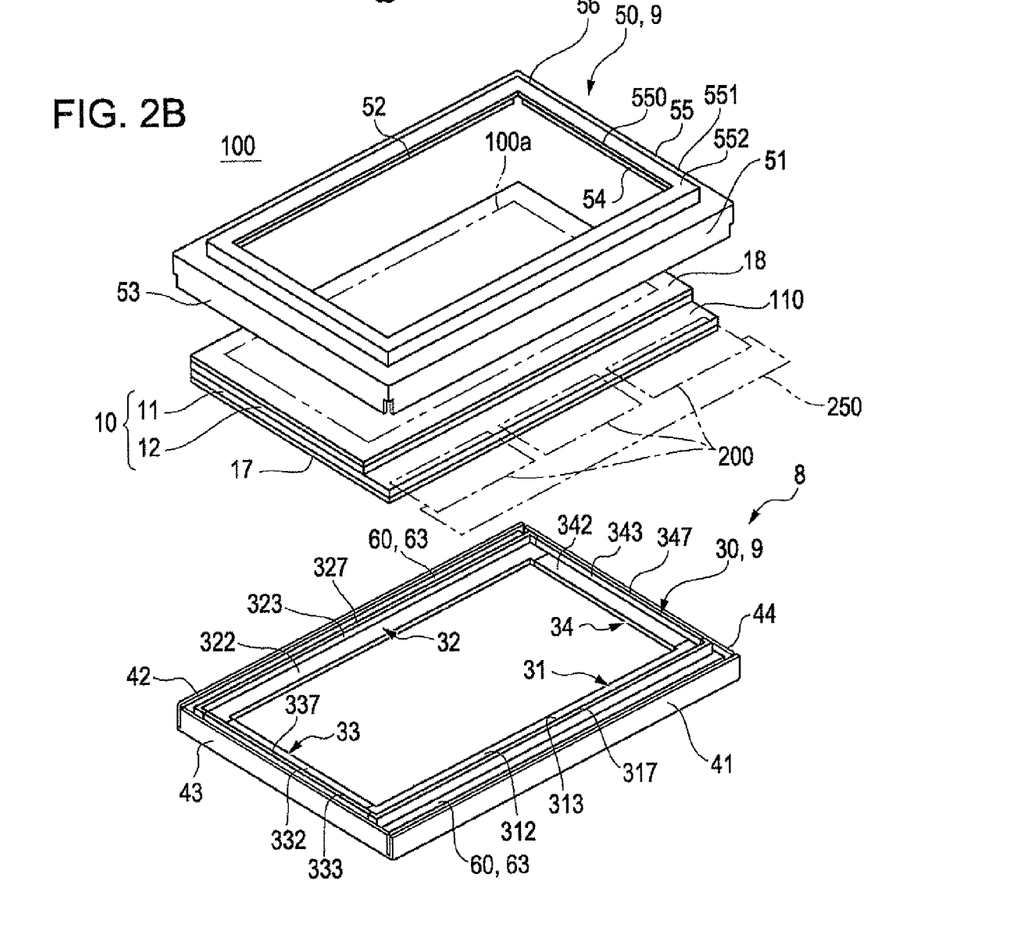
Figure 3:
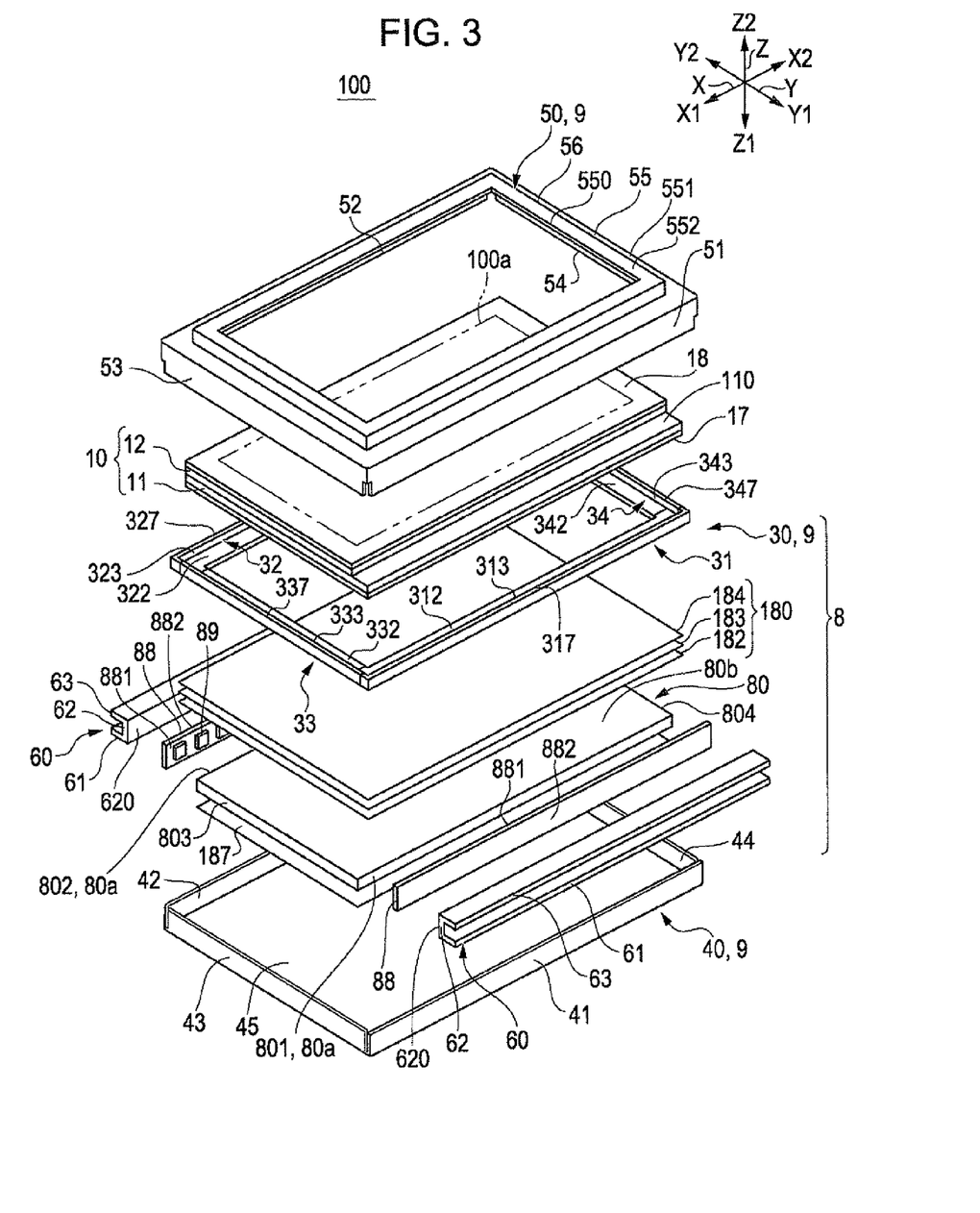
FIG. 3 is an exploded perspective view illustrating that the liquid crystal display device according to the first embodiment of the aspect of the invention is exploded to a component level.
Figure 4:
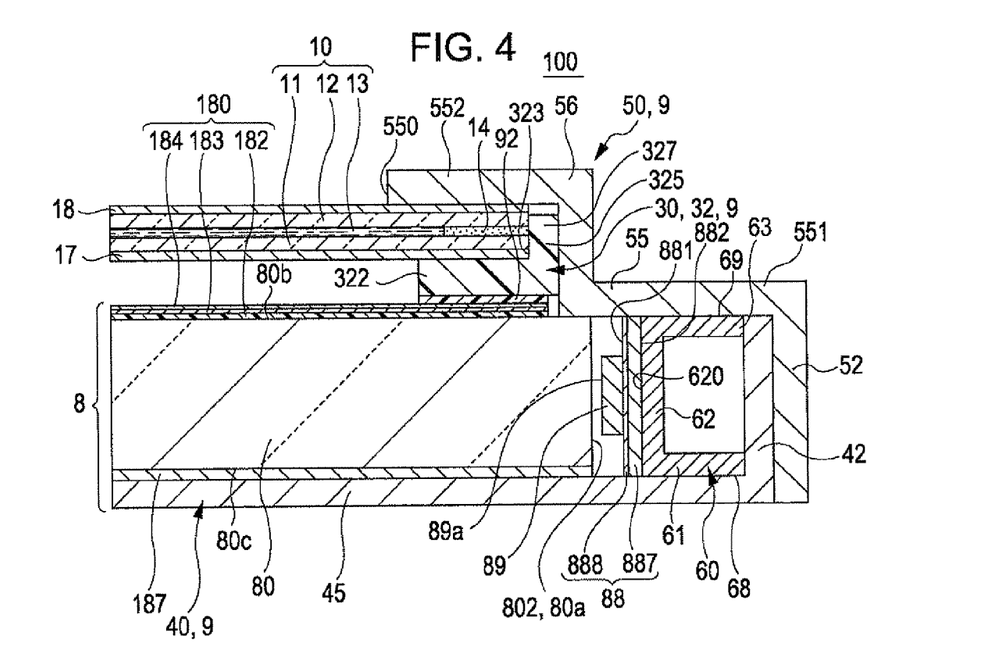
FIG. 4 is a cross-sectional view of the liquid crystal display device according to the first embodiment of the aspect of the invention, taken along line IV-IV in FIG. 1A.

FIGS. 2A and 2B are explanatory views of the overall configuration of the liquid crystal display device 100 according to the aspect of the first embodiment. FIG. 2A is a perspective view of the liquid crystal display device 100. FIG. 2B is an exploded perspective view of the liquid crystal display device 100. FIG. 3 is an exploded perspective view illustrating that the liquid crystal display device 100 according to the first embodiment of the aspect of the invention is exploded to a component level. FIG. 4 is a cross-sectional view of the liquid crystal display device 100 according to the first embodiment of the aspect of the invention, taken along line IV-IV in FIG. 1A.

As shown in FIGS. 2A, 2B, 3 and 4, the liquid crystal display device 100 according to the first embodiment, largely includes the illuminating device 8, which is also known as a backlight device, and the transmissive liquid crystal panel 10 arranged so as to overlap an upper surface of the illuminating device 8. In the liquid crystal display device 100, the illuminating device 8 includes a main frame 9. In the first embodiment, the main frame 9 includes a first metal frame 40 (a lower frame), arranged so as to cover a rear surface of the light guide plate 80 from downward (in the one pointer Z1 of the Z-axis direction), a resin frame 30, holding a peripheral area of the liquid crystal panel 10 in place, and at the same time holding the illuminating device 8 in place by surrounding the illuminating device 8, from over the first metal frame 40, and a second metal frame 50 (an upper frame) arranged above the resin frame 30 (in the other pointer Z2 of the Z-axis direction).

The resin frame 30 holds the edge of the liquid crystal panel 10 and at the same time has the shape of a rectangle surrounding the edge of the liquid crystal panel 10. In the first embodiment, the resin frame 30 includes four frame plates 31, 32, 33, and 34 corresponding to the four sides of the liquid crystal panel 10, respectively. In the first embodiment, the resin frame 30 is black in color, and functions as a light absorbing member to prevent light leakage within the illuminating device 8. The frame plates 31, 32, 33, and 34 include plate-shaped support portions 312, 322, 332, and 342, and ridges 317, 327, 337, and 347, respectively. The ridges 317, 327, 337, and 347 protrude forward (in a direction of emitting illumination light/in the other pointer Z2 of the Z-axis direction) from the plate-shaped support portions 312, 322, 332, and 342, respectively. Because of this, within the frame plates 31, 32, 33, and 34, corner portions 313, 323, 333, and 343 are formed by the plate-shaped support portions 312, 322, 332, and 342 and the ridges 317, 327, 337, and 347. The corner portions 313, 323, 333, and 343 hold the liquid crystal panel 10 in place. Furthermore, the light guide plate 80 of the illuminating device 8 and the light emitting element 89 are arranged in a direction of the rear surfaces of the plate-shaped support portions 312, 322, 332, and 342 (in a direction opposite to the direction in which the illumination light is emitted/in the one pointer Z1 of the Z-axis direction). Lower ridge 325 is also shown.

The first metal frame 40 is formed by performing, for example, a pressing operation on a thin metal plate, such as a SUS plate. The first metal frame 40 includes a bottom plate 45, and four side plates 41, 42, 43, and 44 that protrude forward from an edge of the bottom plate 45. The first metal frame 40 is rectangular, and box-shaped with an opening in an upward direction.

The second metal frame 50, like the first metal frame 40, is also formed by performing, for example, the pressing operation on the thin metal plate, such as the SUS plate. The second metal frame 50 includes a front plate 55 (an edge plate), which is rectangular, and four side plates 51, 52, 53, and 54 that protrude backward from an edge of the bottom plate 55 (in a direction of the first metal frame 40), respectively. The side plates 51, 52, 53, and 54 overlap the outer sides of the side plates 41, 42, 43, and 44 of the first metal frame 40, respectively.

A step portion 56 is formed in the front plate 55. A first flat plate 551 and a second flat plate 552 are formed outside and inside, respectively, with the step portion 56 in between, in the front plate 55. The first flat plate 551 is positioned at a lower height than the second flat plate 552 (in a direction in which the light guide plate 80 is positioned/in the one pointer of the Z-axis direction). The side plates 51, 52, 53, and 54 protrude backward from an edge of the first flat plate 551. In the first embodiment, in the front plate 55, a rectangular window 550 through which to emit light emitted from the liquid crystal panel 10 is formed in the second flat plate 552 positioned further to the inside than the step portion 56. Because of this, the second metal frame 50 has the shape of a rectangle, and the front plate 55 covers the whole edge of the display light emitting portion of the liquid crystal panel 10.

The second metal frame 50 with this configuration, the resin frame 30, and the first metal frame 40 are combined using, for example, a screw (not shown). Thus, the liquid crystal panel 10 and the illuminating device 8 are held in place within an assembly of the second metal frame 50, the resin frame 30, and the first metal frame 40. More specifically, an end portion of the liquid crystal panel 10 is interposed between the plate-shaped support portions 312, 322, 332, and 342 of the resin frame 30 and the portion of the front plate 55 of the second metal frame 50 which is positioned further to the inside than the step portion 56.

Furthermore, a reflective sheet 187, the light guide plate 80, and an edge of an optical sheet 180 (a diffusion sheet 182, and prism sheets 183 and 184) are interposed between the plate-shaped support portions 312, 322, 332, and 342 of the resin frame 30 and the bottom plate 45 of the first metal frame 40. Because of this, the edge of the optical sheet 180 is interposed between the plate-shaped support portions 312, 322, 332, and 342 of the resin frame 30 and the light guide plate 80. At this point, the front plate 55 of the second metal frame 50 is in a position to overlap an edge of the light guide plate 80. Because of this, the light guide plate 80 and the reflective sheet 187 are interposed between the plate-shaped support portions 312, 322, 332, and 342 of the resin frame 30 and the bottom plate 45 of the first metal frame 40, and at the same time are interposed between the front plate 55 of the second metal frame 50 and the bottom plate 45 of the first metal frame 40.

Furthermore, a flexible sheet 92 is affixed to the bottom of the plate-shaped support portions 312, 322, 332, and 342 of the resin frame 30. Therefore, when assembling the liquid crystal display device 100, the illuminating device 8 is supported with the help of the flexible sheet 92. Furthermore, when assembling the liquid crystal display device 100, the optical sheet 180 of the illuminating device 8 (the diffusion sheet 182, the prism sheets 183 and 184 and others) is pressed so as to enable the flexible sheet 92 to prevent a lifting phenomenon and a position slippage.

Configuration of Liquid Crystal Panel 10

As shown in FIGS. 2A, 2B, 3, and 4, the liquid crystal panel 10 is quadrilateral and flat. The liquid crystal panel 10 includes an element substrate 11 on which pixel electrodes (not shown) are formed, an opposite substrate 12 facing the element substrate 11 with a given space between the element substrate 11 and the opposite substrate 12, and a sealant 14, in the rectangular shape, attaching the element substrate 11 and the opposite substrate 12 to each other. A liquid crystal layer 13 is held in place within an area enclosed by the sealant 14 in the liquid crystal panel 10. The element substrate 11 and the opposite substrate 12 are made from such a translucent substrate as a glass substrate. In the element substrate 11, a plurality of scan lines (not shown) extend in the X-axis direction, and a plurality of data lines (not shown) extend in the Y-axis direction. A switching element (not shown) and a pixel electrode are provided at a position corresponding to a point where the scan line and the data line intersect.

In the first embodiment, the opposite substrate 12 is arranged in a direction of emitting display light, and the element substrate 11 is arranged in a direction of the illuminating device 8. Furthermore, on a surface of the opposite substrate 12, facing the element substrate 11, a frame layer (not shown) made from a light shielding layer in the rectangular frame shape is formed along an inner edge of the four lines of the sealant 14. An area defined by an inner edge of the frame layer is an image display area 100*a*. In addition, an inner edge of the front plate 55 of the second metal frame 50 are positioned with respect with the middle of the width direction of the frame layer, and thus the window 550 of the second metal frame 50 overlaps the image display area 100*a* and an inner edge portion of the frame layer.

The liquid crystal panel 10 is configured as a liquid crystal panel that is a type of TN (Twisted Nematic), a type of ECB (Electrically Controlled Birefringence), or a type of VAN (Vertical Aligned Nematic). The pixel electrodes are formed on the element substrate 11, and common electrodes (not shown) are formed in the opposite substrate 12. In addition, in a case where the liquid crystal panel 10 is a type of IPS (In Plane Switching) or a type of FFS (Fringe Field Switching), the common electrodes are formed in the element substrate 11. Furthermore, the element substrate 11 may be arranged in a direction of emitting the display light toward the opposite substrate 12. An upper polarizing 18 is arranged on an upper surface of the liquid crystal panel 10 so as to overlap the liquid crystal panel 10, and a lower polarizing 17 is arranged between a lower surface of the liquid crystal panel 10 and the illuminating device 8.

In the first embodiment, the element substrate 11 is larger in size than the opposite substrate 12. Because of this, the element substrate 11 includes a protrusion portion 110 that protrudes from below an edge of the opposite substrate 12 in the one pointer Y1 of the Y-axis direction. A plurality of flexible wiring substrates 200 is connected to an upper surface of the protrusion portion 110. The flexible wiring substrate 200 is connected to a circuit substrate 250, made from a rigid substrate. A control IC (not shown) making up the image signal supply unit 270 as described above referring to FIGS. 1A and 1B, and a light source drive IC (not shown) making up the light source drive unit 280 are mounted on the circuit substrate 250.

Configuration of Illuminating Device 8

As shown in FIGS. 3 and 4, the illuminating device 8 includes the light guide plate 80 that is arranged so as to overlap a rear surface of the liquid crystal panel 10, and the plurality of light emitting elements 89 that are arranged toward a light emitting surface 89*a*, facing an area in the light incident portion 80*a* which ranges from one periphery of the light incident portion 80*a* (from the one pointer X1 of the X-axis direction) to the other periphery of the light incident portion 80*a* (to the other pointer X2 of the X-axis direction). In the first embodiment, the plurality of light emitting elements 89 are mounted on a mounting surface 881 of the light source substrate 88 that extends along the light incident portion 80*a* in the X-axis direction, and the light source substrate 88 are arranged in such a manner that the mounting surface 881 may face the light incident portion 80*a* of the light guide plate 80. The light emitting element 89 is an LED (Light Emitting Diode) emitting white light, and emits the light-source light as diverging light.

In the first embodiment, in the illuminating device 8, the side surfaces 801 and 802 of the side surfaces 801, 802, 803, and 804 of the light guide plate 80 are opposite to each other in the Y-axis direction. These two side surfaces 801 and 802 serve as the light incident portion 80*a*. Because of this, the plurality of light emitting elements 98 face a light emitting surface 89*a* toward two of the light incident portions 80*a* (the side surface 801, 802) of the light guide plate 80 and are arranged toward each of two of the light incident portions 80*a* (the side surface 801, 802) from one side end to the other side end. Furthermore, two of the light source substrates 88 extend along two of the light incident portions 80*a* (the side surfaces 801 and 802), respectively. The plurality of light emitting elements 89 is mounted on each mounting surfaces 881 of the two of the light source substrates 88.

In the first embodiment, the light guide plate 80 is a translucent resin plate, made from an acrylic resin, a polymethyl styrene resin, or a polycarbonate resin. The reflective sheet 187 is arranged between a rear surface 80*c* of the light guide plate 80 (an opposite surface of the light guide plate 80 to an outgoing light surface 80*b*/an opposite surface) and the bottom plate 45 of the first metal frame 40, so as to overlap the rear surface 80*c* and the bottom plate 45. The resin plate used in the light guide plate 80 is formed, for example, using an extrusion molding method or an injection molding method.

Furthermore, the optical sheet 180, such as the diffusion sheet 182 and the prism sheets 183 and 184, is arranged between an upper surface (the outgoing light surface 80*b*) of light guide plate 80 and the liquid crystal panel 10, so as to overlap the upper surface of light guide plate 80 (the outgoing light surface 80*b*) and the liquid crystal panel 10. The diffusion sheet 182 is made from a sheet having a coating layer formed by dispersing silica particles into a translucent resin, such as an acrylic resin or a polycarbonate resin. In the first embodiment, the two prism sheets 183 and 184 are arranged in such a manner that ridge lines of the prism sheets 183 and 184 may intersect. Because of this, the illumination light emitted from the outgoing light surface 80*b* of the light guide plate 80 are dispersed in all directions by the diffusion sheet 182, and then is given a directivity that creates a result of retaining a peak in the forward direction of the liquid crystal panel 10, by the two prism sheets 183 and 184.

Furthermore, in the light guide plate 80, a plurality of grooves (not shown), which is made from linear fine concavities extending in the X-axis direction, are formed as a spread pattern in a rear surface 80c on which the reflective sheet 187 is positioned. In the first embodiment, the further the groove runs away from the light emitting element 89, the higher the density of the grooves is. Because of this, the intensity distribution of the illumination light emitted from the light guide plate 80 is uniform, regardless of the distance from the light emitting element 89.

In the first embodiment, the light source substrate 88 is arranged in such a manner that a mounting surface 881 on which the light emitting elements 89 are mounted may face the light incident portion 80a of the light guide plate 80. Furthermore, the light source substrate 88 has a configuration in which a wiring pattern and a land, along with an insulation layer, are provided on one surface (the one surface in a direction of the mounting surface 881) of a metal plate 887 (a support plate) that extends along the light incident portion 80a. This configuration is made possible when a flexible wiring substrate 888, on which a resin base material layer, a wiring pattern, and an insulating protective layer are laminated in this order, is attached to the mounting surface 881 of the metal plate 887. Therefore, the land, on which the wiring pattern and chips of the light emitting elements 89 are mounted, is electrically insulated from the metal plate 887. In the first embodiment, the metal plate 887 is made from an aluminum plate. The metal plate 887 not only provides mechanical strength to the light source substrate 88, but also serves as a heat-dissipating plate dissipating heat generated from the light emitting element 89.

A light source support member 60, which holds the light source substrate 88 in place, is arranged on the other surface 882 of each of the two light source substrates 88. At this point, in the second metal frame 50, the front plate 55 protrudes further to the outside than the resin frame 30, with respect to the in-plane direction of the light guide plate 80. Furthermore, the resin frame 30 is arranged further to the inside than the light source support member 60, with respect of the in-plane direction of the light guide plate 80. Because of this, the light source support member 60 is arranged between the bottom plate 45 of the first metal frame 40 and the front plate 55 of the second metal frame 50. In the first embodiment, the light source support member 60 is a bar-shaped metal material that extends along the other surface 882 of the light source substrate 88, and is made from, for example, aluminum, or iron-series metal.

Configuration of Light Source Support Member 60

Mainly referring to FIGS. 3 and 4, a specific configuration of the light source support member 60, which is provided in a direction in which the side surface 802 of the light guide plate 80 is positioned, and a heat dissipation configuration for the light emitting element 89 are described. Furthermore, in the first embodiment, the light emitting element 89, the light source substrate 88, and the light source support member 60 are provided also in a direction of the side surface 801 of the light guide plate 80, but a description of a peripheral configuration of the side surface 801 is omitted because the side surface 801 is the same as the side surface 802 in peripheral configuration.

As shown in FIGS. 3 and 4, the light source support member 60 includes a substrate support plate portion 62 that is opposite to the light incident portion 80a of the light guide plate 80. A surface of the substrate support plate portion 62, which is toward the light guide plate 80, is defined as a substrate support surface 620. The other surface 882 of the light source substrate 88 comes in contact with the substrate support surface 620, so as to overlap the substrate support surface 620. The light source substrate 88 is fixed to the substrate support plate portion 62, for example, using a screw. When this is done, the substrate support surface 620 and the other surface 882 of the light source substrate 88 come in contact with each other.

In the first embodiment, as described below, the light source support member 60 includes a first contact surface 68 that comes into contact with the first metal frame 40, and a second contact surface 69 that comes into contact with the second metal frame 50. Furthermore, in the first embodiment, in the second metal frame 50, the front plate 55 protrudes further to the outside than the resin frame 30, and at the same time the resin frame 30 is arranged further to the inside than the light source support member 60. Because of this, the second contact surface 69 of the light source support member 60 comes into contact with the second metal frame 50, in an area where the second contact surface 69 is positioned further to the outside than the resin frame 30.

More specifically, the light source support member 60 includes a first plate 61 bending from an end portion of the substrate support plate portion 62 that faces the bottom plate 45 of the first metal frame 40, in the opposite direction to the direction in which the light guide plate 80 is positioned, so as to overlap the bottom plate 45. The first plate 61 has a first contact surface 68 that comes into contact with the bottom plate 45 of the first metal frame 40. At this point, an end portion of the first plate 61, which is positioned in the opposite direction to the direction in which the light guide plate 80 is positioned, comes into contact with a side plate 42 of the first metal frame 40.

Furthermore, the light source support member 60 includes a second plate 63 bending from the end portion of the substrate support plate portion 62 that faces the front plate 55 of the second metal frame 50, in the opposite direction to the direction in which the light guide plate 80 is positioned, so as to overlap the front plate 55. The second plate 63 has a second contact surface 69 that comes into contact with the first flat plate 551, in the front plate 55 of the second metal frame 50. At this point, an end portion of the second plate 63, which is positioned in the opposite direction to the direction in which the light guide plate 80 is positioned, comes into contact with a side plate 42 of the first metal frame 40.

In this configuration, the first plate 61 and the bottom plate 45 of the first metal frame 40 are connected to each other, for example, using a screw, and thus the light source support member 60 is held in place between the bottom plate 45 of the first metal frame 40 and the front plate 55 of the second metal frame 50. Furthermore, the second plate 63 and the front plate 55 of the second metal frame 50 are connected to each other, for example, using a screw, and thus the light source support member 60 is held in place between the bottom plate 45 of the first metal frame 40 and the front plate 55 of the second metal frame 50.

Main Effects of the First Embodiment

As described above, in the liquid crystal display device 100 according to the first embodiment, the light source substrate 88 on which the light emitting elements 89 are mounted is held in place with the other surface 882 coming into contact with substrate support plate portion 62 of the light source support member 60 made of metal. Because of this, the heat generated in the light emitting element 89 is transferred to the light source support member 60 from the light source substrate 88. At this point, the light source support member 60 has a first contact surface 68 that comes into contact with the first metal frame 40, and a second contact surface 69 that comes into contact with the second metal frame 50. Because of this, the heat generated in the light emitting elements 89 is transferred to the light source support member 60 made of metal through the light source substrate 88. Thereafter, the heat is dissipated to the first metal frame 40 through the first contact surface 68, and at the same time to the second metal frame 50 through the second contact surface 69. Because of this, in the first embodiment, the heat generated in the light emitting elements 89 may be dissipated using at least two routes. As a result, even though the light guide plate 80, the light emitting element 89 and the liquid crystal panel 10 are held in place by the first metal frame 40, the resin frame 30, and the second metal frame 50, the heat generated in the light emitting elements 89 may be dissipated more efficiently. Therefore, the light emitting element 89 may be prevented from increasing in temperature.

Especially in the first embodiment, since the light source substrate 88 includes the metal plate 887 on the other surface 882, the heat generated in the light emitting elements 89 may be efficiently dissipated to the light source support member 60 made of metal through the metal plate 887. Therefore, a rise in the temperature of the light emitting elements 89 may be reliably suppressed to be low.

Furthermore, in the light source member 60, since the end portions of the first plate 61 and the second plate 63 come into with the side plate 42 of the first metal frame 40, the light source support member 60 (the positions of the light emitting elements 89) may be arranged with high positional accuracy, and at the same time the heat transferred to the light source support member 60 may be dissipated to the side plate 42 of the first metal frame 40 more efficiently. Therefore, a rise in the temperature of the light emitting elements 89 may be reliably suppressed to be low.

Furthermore, in the first embodiment, the light guide plate 80 and the reflective sheet 187 are interposed between the plate-shaped support portions 312, 322, 332, and 342 of the resin frame 30 and the bottom plate 45 of the first metal frame 40, and at the same time are interposed between the front plate 55 of the second metal frame 50 and the bottom plate 45 of the first metal frame 40. Because of this, the light guide plate 80 and the reflective sheet 187 may be held in place in a certain manner, even though the resin frame 30 is arranged further to the inside than the light source support member 60 to retain the second contact surface 69.

Second Embodiment

Figure 5:
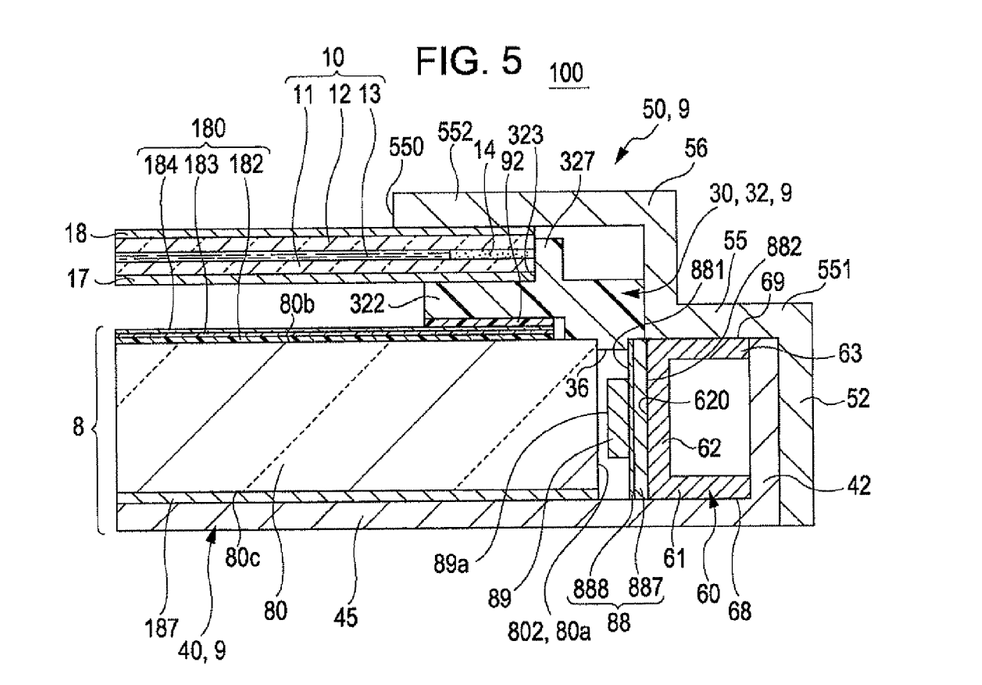
FIG. 5 is a cross-sectional view of the liquid crystal display device according to a second embodiment of an aspect of the invention, taken along line V-V in FIG. 1A.

FIG. 5 is a cross-sectional view of a liquid crystal display device 100 according to a second embodiment of the invention, taken along line V-V in FIG. 1A. Furthermore, because a basic configuration of the second embodiment is the same as the first embodiment, common elements are given like reference numerals, and descriptions of the common elements are omitted.

In the first embodiment, since a front plate 55 of a second metal frame 50 is in a position to overlap an end portion of a light guide plate 80, the light guide plate 80 and a reflective sheet 187 are interposed between the plate-shaped support portions 312, 322, 332, and 342 of a resin frame 30 and a bottom plate 45 of a first metal frame 40, and at the same time are interposed between a front plate 55 of a second metal frame 50 and the bottom plate 45 of the first metal frame 40. In contrast, in the second embodiment, as shown in FIG. 5, the resin frame 30 is provided further to the inside than a light source support member 60, but the plate-shaped support portion 322 is provided so as to extend beyond a ridge 327. Because of this, the resin frame 30 overlaps the end portion of the light guide plate 80 and a light source substrate 88. Therefore, in the second embodiment, the light guide plate 80 and the light source substrate 88 are held in place in a certain manner, even though the resin frame 30 is arranged further to the inside than the light source support member 60 to retain a second contact surface 69. That is, the light guide plate 80 and a reflective sheet 187 are interposed between the plate-shaped support portion 322 of the resin frame 30 and the bottom plate 45 of the first metal frame 40, and at the same time even the light source substrate 88 is interposed between the plate-shaped support portion 322 of the resin frame 30 and the bottom plate 45 of the first metal frame 40.

Furthermore, in the second embodiment, in a rear surface of the plate-shaped support portion 322, a convexity 36 is provided into between the light guide plate 80 and the light source substrate 88. Because of this, in the second embodiment, the positioning of the light source substrate 88 and the light source support member 60 may be reliably performed, even though the resin frame 30 is arranged further to the inside than the light source support member 60 to retain a second contact surface 69. That is, the light source substrate 88 and the light source support member 60 are interposed between the convexity 36 and a side plate 42 of the first metal frame 40.

In the second embodiment with this configuration, the positioning of the light guide plate 80, the light source substrate 88 and the light source support member 60 may be reliably performed by the resin frame 30, even though the resin frame 30 is arranged further to the inside than the light source support member 60 to retain the second contact surface 69.

Third Embodiment

Figure 6:
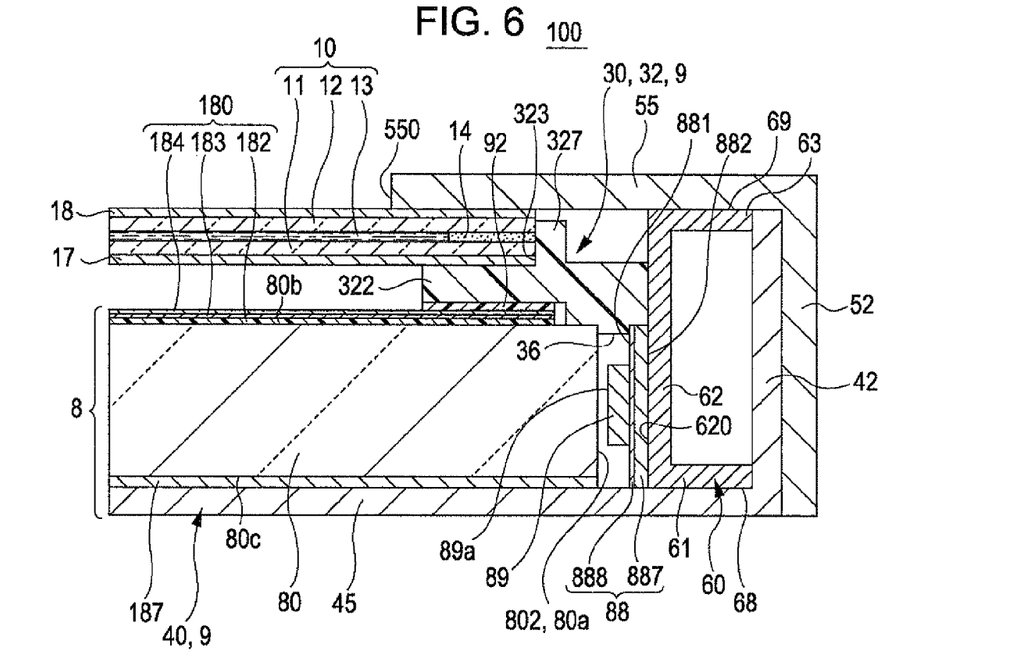
FIG. 6 is a cross-sectional view of the liquid crystal display device according to a third embodiment of an aspect of the invention, taken along line VI-VI in FIG. 1A.

FIG. 6 is a cross-sectional view of a liquid crystal display device 100 according to a third embodiment of the invention, taken along line VI-VI in FIG. 1A. Furthermore, because a basic configuration of the third embodiment is the same as the first and second embodiments, common elements are given like reference numerals, and descriptions of the common elements are omitted.

In the first and second embodiments, a step portion 56 is provided on a front plate 55 of a second metal frame 50. However, in the third embodiment, as shown in FIG. 6, the front plate 55 is flat without having to provide the step portion 56. Even in this configuration, a light source support member 60 extends further forward than a resin frame 30, and has a second contact surface 69 that comes into contact with the front plate 55.

At this point, the resin frame 30 is provided further to the inside than the light source support member 60, but a plate-shaped support portion 322 is provided so as to extend to beyond a ridge 327, as in the second embodiment. Because of this, the resin frame 30 overlaps an end portion of a light guide plate 80 and a light source substrate 88. Therefore, in the third embodiment, the light guide plate 80 and the light source substrate 88 may be held in place in a certain manner, even though the resin frame 30 is arranged further to the inside than the light source support member 60 to retain a second contact surface 69. That is, the light guide plate 80 and the reflective sheet 187 are interposed between the plate-shaped support portion 322 of the resin frame 30 and a bottom plate 45 of a first metal frame 40, and at the same time even a light source substrate 88 is interposed between the plate-shaped support portion 322 of the resin frame 30 and the bottom plate 45 of the first metal frame 40.

Furthermore, in the third embodiment, in a rear surface of the plate-shaped support portion 322, a convexity 36 is provided into between the light guide plate 80 and the light source substrate 88. Because of this, in the third embodiment, the positioning of the light source substrate 88 and the light source support member 60 may be reliably performed, even though the resin frame 30 is arranged further to the inside than the light source support member 60 to retain the second contact surface 69. That is, the light source substrate 88 and the light source support member 60 are interposed between the convexity 36 and the side plate 42 of the first metal frame 40.

In addition, in the third embodiment, the light source support member 60 is interposed between the resin frame 30 and the side plate 42 of the first metal frame 40. Because of this, in the third embodiment, the positioning of the light guide plate 80, the light source substrate 88 and the light source support member 60 may be reliably performed by the resin frame 30, even though the resin frame 30 is arranged further to the inside than the light source support member 60 to retain the second contact surface 69.

Fourth Embodiment

Figure 7:
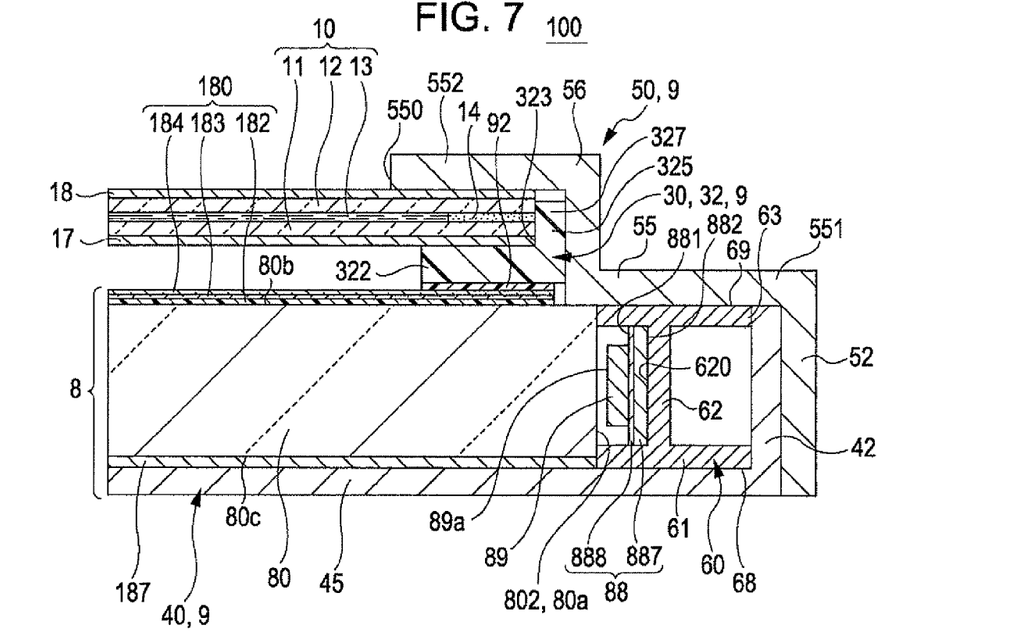
FIG. 7 is a cross-sectional view of the liquid crystal display device according to a fourth embodiment of an aspect of the invention, taken along line VII-VII in FIG. 1A.

FIG. 7 is a cross-sectional view of a liquid crystal display device 100 according to a fourth embodiment of the invention, taken along line VII-VII in FIG. 1A. Furthermore, because a basic configuration of the fourth embodiment is the same as the first embodiment, common elements are given like reference numerals, and descriptions of the common elements are omitted.

In the first embodiment, a first plate 61 and a second plate 63 bend from end portions of a substrate support plate portion 62 in the opposite direction to the direction in which the light guide plate 80 is positioned. However, in the fourth embodiment, as shown in FIG. 7, the first plate 61 bends from the end portions of the substrate support plate portion 62 both in a direction in which the light guide plate 80 is positioned, and in the opposite direction to the direction in which the light guide plate 80 is positioned, and thus has a first contact surface 68 that comes into contact with a bottom plate 45 of a first metal frame 40. At this point, an end portion of the first plate 61, which is positioned in the opposite direction to the direction in which the light guide plate 80 is positioned, comes into contact with a side plate 42 of the first metal frame 40. The end portion of the first plate 61, which is positioned in a direction to the direction in which the light guide plate 80 is positioned, comes into contact with the light guide plate 80.

Furthermore, the second plate 63 bends from the end portions of the substrate support plate portion 62 both in a direction in which the light guide plate 80 is positioned, and in the opposite direction to the direction in which the light guide plate 80 is positioned, and thus has a second contact surface 69 that comes into contact with a front plate 55 of a second metal frame 50. At this point, the end portion of the second plate 63, which is positioned in the opposite direction to the direction in which the light guide plate 80 is positioned, comes into contact with the side plate 42 of the first metal frame 40. An end portion of the second plate 63, which is positioned in a direction to the direction in which the light guide plate 80 is positioned, comes into contact with the light guide plate 80.

Because of this, in the fourth embodiment, the first contact surface 68 and the second contact surface 69 are large in area, and thus heat dissipation from a light source support member 60 to the first metal frame 40 and the second metal frame 50 may increase. Furthermore, in the fourth embodiment, the positioning of a light source substrate 88 and the light source support member 60 may be reliably performed, since the light source substrate 88 and the light source support member 60 are interposed between the light guide plate 80 and the side plate 42 of the first metal frame 40, even though a resin frame 30 is arranged further to the inside than the light source support member 60 to retain the second contact surface 69.

Fifth Embodiment

Figure 8:
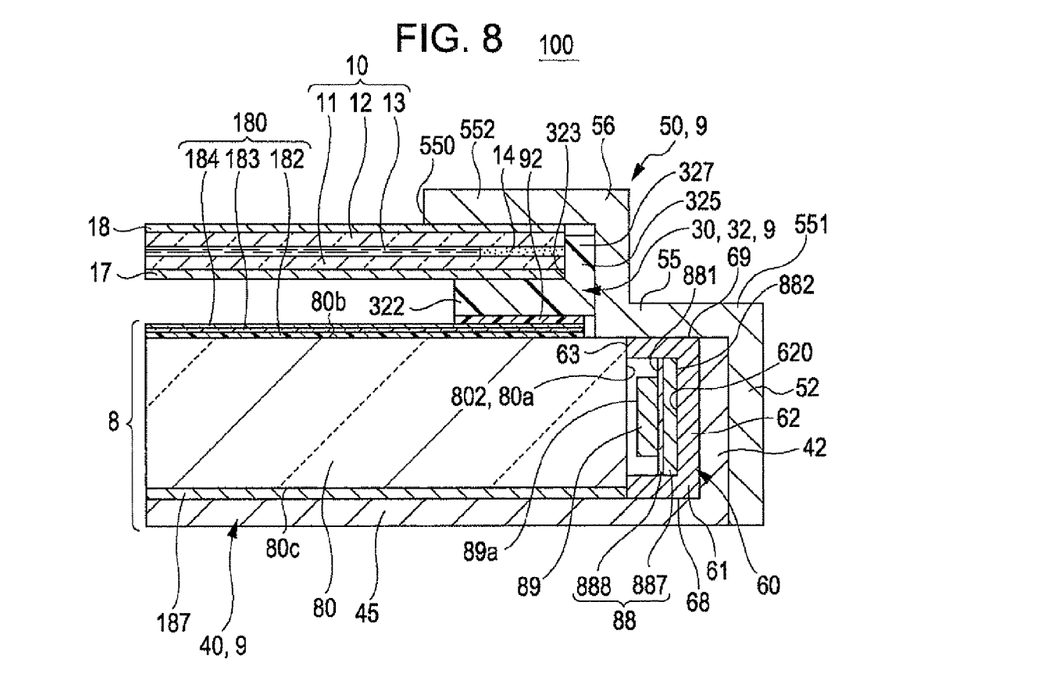
FIG. 8 is a cross-sectional view of the liquid crystal display device according to a fifth embodiment of an aspect of the invention, taken along line VIII-VIII in FIG. 1A.

FIG. 8 is a cross-sectional view of a liquid crystal display device 100 according to a fifth embodiment of the invention, taken along line VIII-VIII in FIG. 1A. Furthermore, because a basic configuration of the fifth embodiment is the same as the first embodiment, common elements are given like reference numerals, and descriptions of the common elements are omitted.

In the first embodiment, a first plate 61 and a second plate 63 bend from end portions of a substrate support plate portion 62 in the opposite direction to the direction in which the light guide plate 80 is positioned. However, in the fifth embodiment, as shown in FIG. 8, the first plate 61 bends from the end portion of the substrate support plate portion 62 in a direction in which the light guide plate 80 is positioned, and thus has a first contact surface 68 that comes into contact with a bottom plate 45 of a first metal frame 40. Furthermore, the substrate support plate portion 62 comes into contact with a side plate 42 of the first metal frame 40, and thus makes up a portion of the first contact surface 68. At this point, end portions of the first plate 61, which is positioned in a direction in which the light guide plate 80 is positioned, comes into contact with the light guide plate 80.

Furthermore, the second plate 63 bends from the end portion of the substrate support plate portion 62 in a direction in which the light guide plate 80 is positioned, and thus has a second contact surface 69 that comes into contact with a front plate 55 of a second metal frame 50. At this point, the end portion of the second plate 63, which is positioned in a direction to the direction in which the light guide plate 80 is positioned, comes into contact with the light guide plate 80.

Because of this, in the fifth embodiment, the positioning of the light source substrate 88 and the light source support member 60 may be reliably performed, since a light source substrate 88 and a light source support member 60 are interposed between the light guide plate 80 and the side plate 42 of the first metal frame 40, even though a resin frame 30 is arranged further to the inside than the light source support member 60 to retain the second contact surface 69.

Furthermore, the first plate 61 and the substrate support plate portion 62 makes up the first contact surface 68, resulting in the first contact surface 68 being large in area. Because of this, heat dissipation from the light source support member 60 to the first metal frame 40 may increase.

Sixth Embodiment

Figure 9:
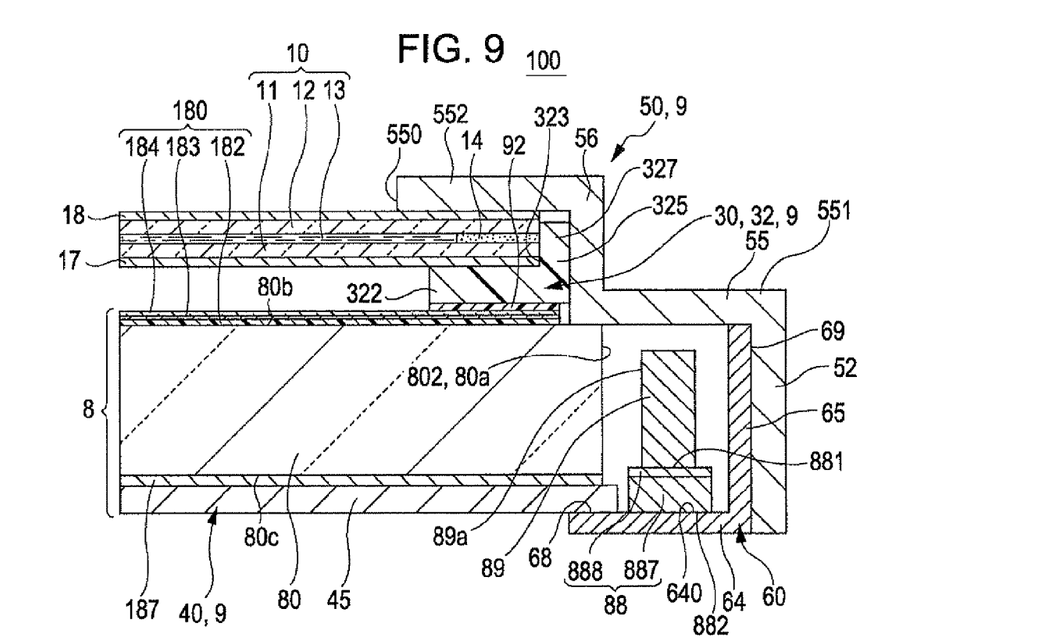
FIG. 9 is a cross-sectional view of the liquid crystal display device according to a sixth embodiment of an aspect of the invention, taken along line IX-IX in FIG. 1A.

FIG. 9 is a cross-sectional view of a liquid crystal display device 100 according to a sixth embodiment of an aspect of the invention, taken along line IX-IX in FIG. 1A. Furthermore, because a basic configuration of the sixth embodiment is the same as the first embodiment, common elements are given like reference numerals, and descriptions of the common elements are omitted.

In the first to fifth embodiments, a mounting surface 881 of a light source substrate 88 is opposite to a light incident portion 80a of a light guide plate 80. However, in the sixth embodiment, as shown in FIG. 9, the mounting surface 881 of the light source substrate 88 is perpendicular to the light incident portion 80a of the light guide plate 80. Because of this, a light source support member 60 has a substrate support plate portion 64 perpendicular to the light incident portion 80a of the light guide plate 80. At the same time the substrate support plate portion 64 is arranged so as to overlap a bottom plate 45 of a first metal frame 40. As a result, a surface of one end portion of the substrate support plate portion 64 becomes a first contact surface 68 and at the same time becomes a substrate support surface 640 that comes in contact with a light source substrate 88, thereby supporting the light source substrate 88.

Furthermore, in the sixth embodiment, the first metal frame 40 does not include a side plate 42. Because of this, the light source support member 60 includes a plate 65 (a first plate) bending from the end portion of the substrate support plate portion 64, which is opposite to the direction in which the light guide plate 80 is positioned, so as to overlap a side plate 52 of a second metal frame 50. As a result, the plate 65 (a first plate) has a second contact surface 69.

Because of this, in the sixth embodiment, even when a mounting surface 881 of the light source substrate 88 is perpendicular to the light incident portion 80a, heat generated in light emitting elements 89 may be dissipated to the first metal frame 40 and the second metal frame 50 through the first contact surface 68 and the second contact surface 69 of the light source support member 60, respectively.

Seventh Embodiment

Figure 10:
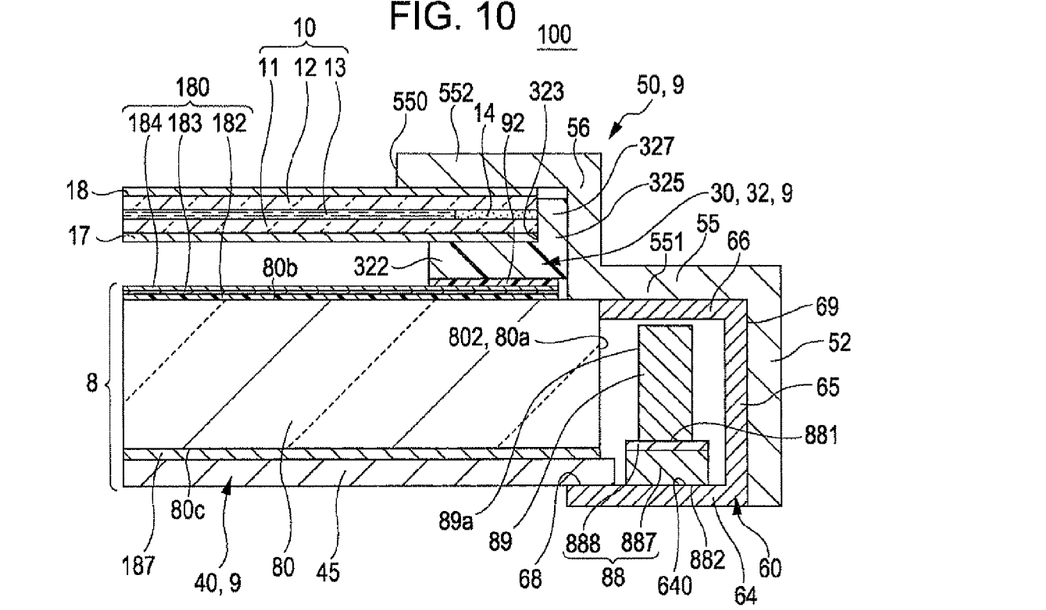
FIG. 10 is a cross-sectional view of the liquid crystal display device according to a seventh embodiment of an aspect of the invention, taken along line X-X in FIG. 1A.

FIG. 10 is a cross-sectional view of a liquid crystal display device 100 according to a seventh embodiment of the invention, taken along line X-X in FIG. 1A. Furthermore, because a basic configuration of the seventh embodiment is the same as the first embodiment, common elements are given like reference numerals, and descriptions of the common elements are omitted.

In the sixth embodiment as described above, a second contact surface 69 is formed by a plate 65. However, in the seventh embodiment, as shown in FIG. 10, a plate 66 (a second plate) is additionally provided which protrudes from a tip of a plate 65 (a first plate) in a direction in which a light guide plate 80 is positioned, so as to overlap a front plate 55 of a second metal frame 50 and make up the second contact surface 69. In this configuration, because a second contact surface 69 is made larger in area, heat generated in light emitting elements 89 may be dissipated to the second metal frame 50 efficiently.

At this point, the tip of the plate 66 comes into contact with the light guide plate 80. Because of this, a light source substrate 88 and a light source support member 60 are interposed between the light guide plate 80 and a side plate 52 of the second metal frame 50. Because of this, the positioning of the light source substrate 88 and the light source support member 60 may be reliably performed, even though a resin frame 30 is arranged further to the inside than the light source support member 60 to retain the second contact surface 69.

Eighth Embodiment

Figure 11:
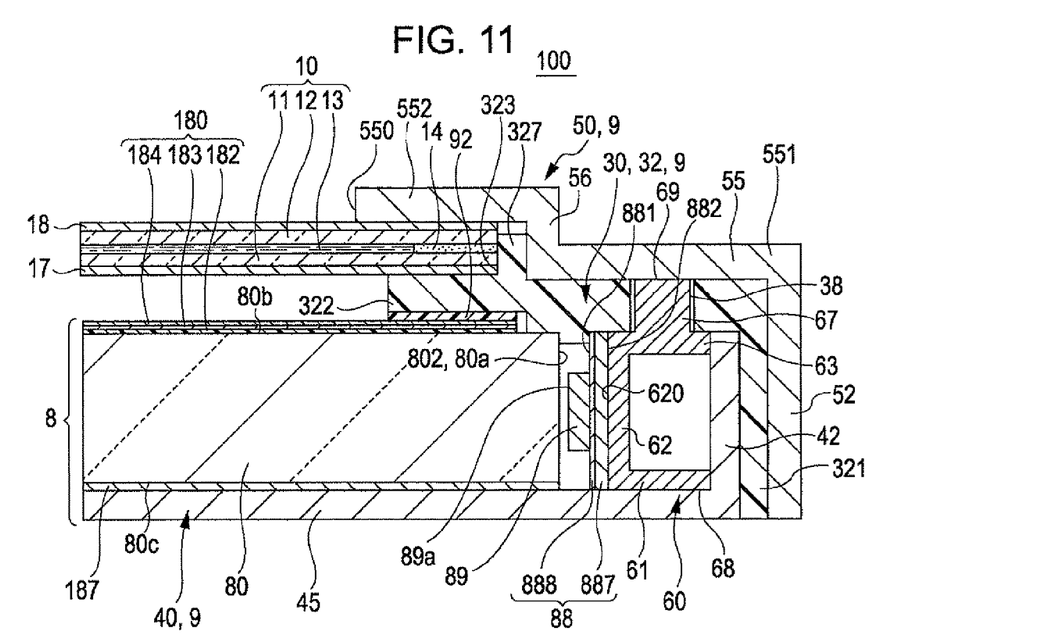
FIG. 11 is a cross-sectional view of the liquid crystal display device according to an eighth embodiment of an aspect of the invention, taken along line XI-XI in FIG. 1A.

FIG. 11 is a cross-sectional view of a liquid crystal display device 100 according to an eighth embodiment of the invention, taken along line XI-XI in FIG. 1A. Furthermore, because a basic configuration of the eighth embodiment is the same as the first and second embodiments, common elements are given like reference numerals, and descriptions of the common elements are omitted.

In the first to seventh embodiments, a resin frame 30 is arranged further to the inside that a light source support member 60. However, in the eighth embodiment, as shown in FIG. 11, a plate-shaped support portion 322 of the resin frame 30 is provided so as to extend to beyond a ridge 327. Furthermore, the resin frame 30 includes a side plate 321 which extends from an outer edge of the ridge 327 toward a first metal frame 40. Because of this, the resin frame 30 is interposed between the light source support member 60 and a second metal frame 50.

At this point, in the resin frame 30, an opening 38 is formed in a plate-shaped support portion 322 that is interposed between a second plate 63 of a light source support member 60 and a front plate 55 of a second metal frame 50. Furthermore, a convexity 67 is formed in the light source support member 60. The convexity 67 protrudes from the second plate 63 into the opening 38, and then comes into contact with a front plate 55 of the second metal frame 50. A second contact surface 69 is formed by a portion of the convexity 67, which comes into contact with the front plate 55. Therefore, even in the eighth embodiment, as in the first to seventh embodiments, heat generated in light emitting elements 89 may be dissipated to a light source substrate 88 and then to the light source support member 60. Thereafter, the heat may be dissipated from a first contact surface 68 and the second contact surface 69, to the first metal frame 40 and the second metal frame 50, respectively.

Furthermore, in the eighth embodiment, the second contact surface 69 is formed by the convexity 67 provided in the light source support member 60, but may be formed by a convexity provided, in a direction of the second metal frame 50, in such a manner that the convexity may protrude from the front plate 55 into the opening 38 and then come into contact with the second plate 63 of the light source support member 60.

Other Embodiments

In the embodiments described above, both of a side surface 801 of a light guide plate 80 and a side surface 802 of the light guide plate 80 are used as a light incident portion 80a. However, the invention may be applied to a liquid crystal display device 100 in which only one of side surfaces 801 and 802 is used as the light incident portion 80a.

In the embodiments described above, what is made of the metal plate 887 and the flexible wiring substrate 888 laminated on the metal plate 887 is used as the light source substrate 88. However, the invention may be applied to a case where the flexible wiring substrate 888 or the rigid substrate is independently used as the light source.

Example of Equipping Electronic Device with Liquid Crystal Display Device 100

In the embodiments described above, the liquid crystal television is taken as an example of the electronic device 2000 that is equipped with the liquid crystal display device 100. In addition to the display used in the liquid crystal television, the liquid crystal display device 100, to which the invention is applied, may be used as a personal computer display, a digital signage display, and a display for an electronic device, such as a car navigation device, and a PDA.

The entire disclosure of Japanese Patent Application No. 2011-178257, filed Aug. 17, 2011 and No. 2012-120521, filed May 28, 2012 are expressly incorporated by reference herein.

What is claimed is:

1. A liquid crystal display device comprising:
a first metal frame including a bottom plate;
a light guide plate having a main surface and a side surface, arranged such that the main surface overlaps the bottom plate of the first metal frame;
a plurality of light emitting elements arranged along the side surface and each of the plurality of the light emitting elements having a light emitting surface facing the side surface;
a light source substrate having a mounting surface on which the plurality of the light emitting elements are mounted;
a light source support member made of metal including a substrate support plate portion supporting the light source substrate, the substrate support plate portion contacting a rear surface of the light source substrate;
a liquid crystal panel disposing in an opposite direction to the first metal frame with respect to the light guide plate;
a second metal frame including a front plate covering a peripheral area of the liquid crystal panel; and
a resin frame including a plate-shaped support portion to interpose the light guide plate between the bottom plate of the first metal frame and the plate-shaped support portion, and including an opening between the light source support member and the second metal frame,
wherein the light source support member has a first contact portion that contacts the first metal frame and a second contact portion that extends through the opening and contacts a bottom surface of the second metal frame that is parallel to the main surface through the opening; and
wherein a top surface of the second contact portion that extends through the opening and contacts the bottom surface of the second metal frame does not protrude from a top surface of the resin frame.

2. The liquid crystal display device according to claim 1, wherein the light source support member is completely disposed away from the light guide plate in a plane view from a normal direction of the main surface.

3. The liquid crystal display device according to claim 1, wherein the resin frame is between the first metal frame and the second metal frame.

4. A liquid crystal display device comprising:
a liquid crystal panel;
a light guide plate having a main surface and a side surface;
a plurality of light emitting elements arranged along the side surface;
a light source substrate having a mounting surface on which the plurality of the light emitting elements are mounted;
a light source support member made of metal including a substrate support plate portion supporting the light source substrate;
a metal frame accommodating the liquid crystal panel and the light source support member, and including a front plate covering a peripheral area of the liquid crystal panel; and
a resin frame disposed between the light source support member and the front plate, and including an opening between the light source support member and the front plate,
wherein the light source support member has a contact portion that extends through the opening and contacts a bottom surface of the front plate that is parallel to the main surface through the opening; and
wherein a top surface of the contact portion that extends through the opening and contacts the bottom surface of the front plate does not protrude from a top surface of the resin frame.

* * * * *